April 7, 1925.  
B. HASKELL  
BRAKE BEAM SUPPORT  
Filed May 10, 1924  
1,532,626  
2 Sheets-Sheet 1
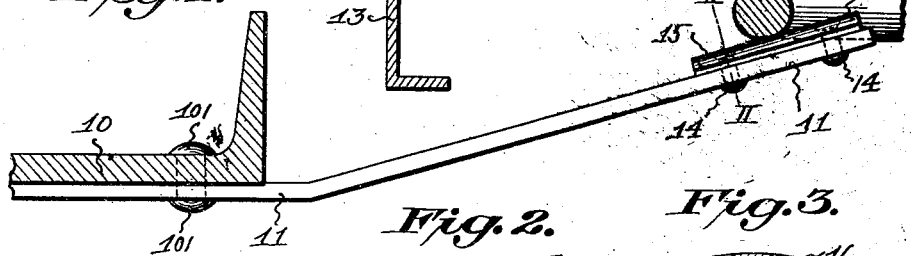
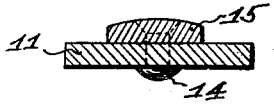
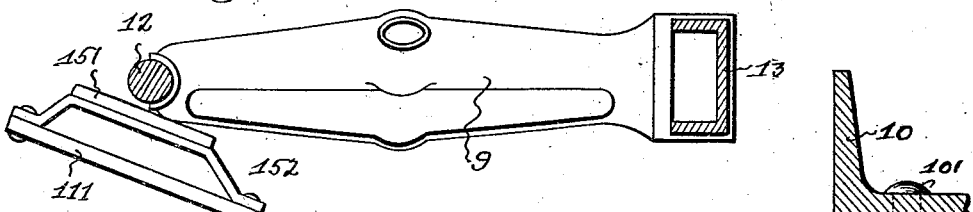
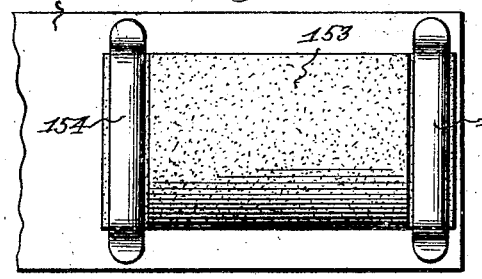
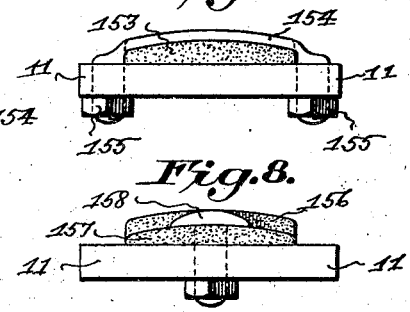
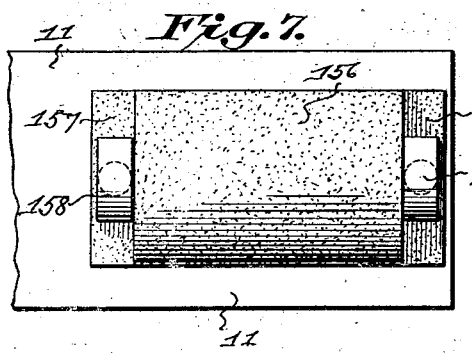
Inventor  
Broderick Haskell,  
By  
Attorney
WITNESS:—

April 7, 1925.  
B. HASKELL  
BRAKE BEAM SUPPORT  
Filed May 10, 1924
1,532,626
2 Sheets-Sheet 2
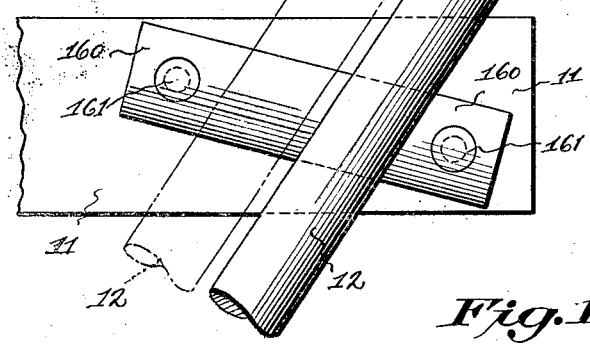
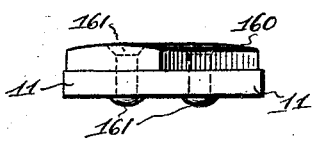
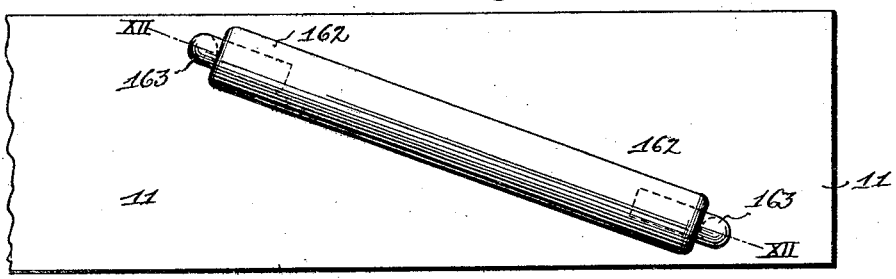
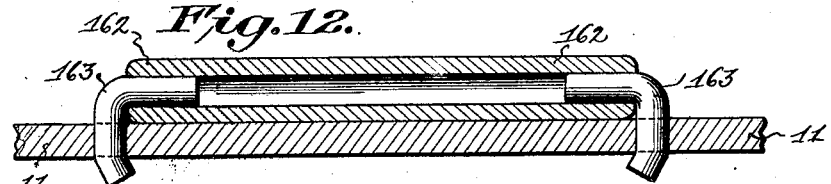
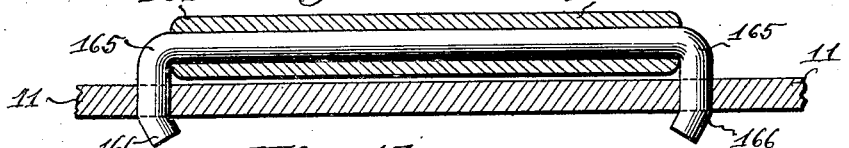
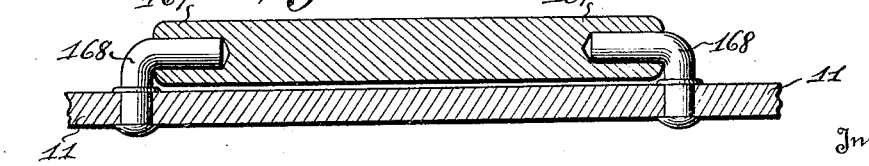
Inventor  
Broderick Haskell,  
By  
Attorney
WITNESS:-

Patented Apr. 7, 1925.

1,532,626

UNITED STATES PATENT OFFICE.

BRODERICK HASKELL, OF FRANKLIN, PENNSYLVANIA.

BRAKE-BEAM SUPPORT.

Application filed May 10, 1924. Serial No. 712,326.

*To all whom it may concern:*

Be it known that I, BRODERICK HASKELL, a citizen of the United States, residing at Franklin, in the county of Venango and State of Pennsylvania, have invented certain new and useful Improvements in Brake-Beam Supports, of which the following is a specification.

This invention relates to brakes for railway cars, and more particularly to third or fourth point supports for brake beams with special provisions for reducing to a minimum the friction between the supporting means and the brake beam, and at the same time eliminate the wear of the brake beam at the point of contact between the supporting member and the brake beam.

The objects of the invention are:

First, to provide a support of the character above indicated which will be simple and inexpensive in construction, capable of being quickly applied to the existing forms of railway trucks and brake mechanism, eliminating metal attachments to supports and brake beams, commonly known as chairs, and insure the continuous and efficient operation of the brake mechanism due to the reduced friction between the contacting members and elimination of wear of the parts of the brake beam.

Second, to provide a combined supporting and anti-friction element or bearing interposed between the brake beam support and brake beam which can be made at a reduced cost, and easily applied and insuring a minimum of friction between the support and brake beam in all positions of said brake beam during the application or release of the brakes.

Third, to provide a combined supporting and anti-friction element or bearing interposed between the brake beam and supporting element which is adapted for use either with a third or fourth point type of brake beam support and adapted to increase to a maximum the life of a brake beam due to minimum wear of the tension or compression member of the brake beam.

Fourth, to construct a combined supporting and anti-friction element or bearing which is of indestructible material, and of such cross-section or exterior contour as to enable the brake beam to easily and readily move or slide over said bearing with a minimum of friction in all angular positions of contact with said bearing during the application and release of the brakes.

Fifth, to construct a rotary combined supporting and anti-friction element or bearing which is capable of automatically exposing a new surface or section to an element of the brake beam resting thereon during the operation of the braking mechanism.

Sixth, other advantages and objects of the invention will appear from the detailed description of the construction, arrangement, manner of applying and operation of the parts which will be hereinafter more fully disclosed.

The invention consists of structural characteristics and relative arrangement of elements which will be presently more fully described and particularly pointed out in the appended claims.

In the drawings in which similar reference characters indicate the same parts in the several figures:

Figure 1 is a fragmentary or detail of the truck and brake mechanism, parts being in vertical section, the same showing the arrangement of the invention when applied to a fourth point support.

Figure 2 is a section on line II—II of Figure 1.

Figure 3 is a section similar to Figure 2 of a modified form.

Figure 4 is a view similar to Figure 1, showing the invention applied to a third point support.

Figure 5 is a fragmentary and top plan view of a modification of the combined supporting and anti-friction element or bearing.

Figure 6 is an end view of the bearing shown in Figure 5.

Figure 7 is a top plan view of a further modification of the bearing.

Figure 8 is an end view of the bearing shown in Figure 7.

Figure 9 is a fragmentary and top plan view of another modified form.

Figure 10 is an end view of Figure 9 with the tension member of the brake beam omitted.

Figure 11 is a top plan view similar to Figure 9, of a modified form.

Figure 12 is a section on line XII—XII of Figure 11.

Figure 13 is a section similar to Figure 12 of a modified form, and

Figure 14 is a view similar to Figure 13 of an additional modified form.

Referring to the drawing, 10 represents a portion of a customary or usual spring-plank, constituting a portion of a car truck frame.

11 indicates a safety brake beam support which is in the form of a bar member of any convenient cross-section and is suitably attached to the spring-plank by any appropriate attaching means 101. This support or bar member 11 extends preferably from the spring-plank 10 longitudinally of the truck and normally to the longitudinal axis of the spring-plank 10, and its outer end may be slightly deflected upwardly, as illustrated, to be directly below the tension member 12 of the brake beam provided with the usual compression member 13. The construction and arrangement of said supporting or safety bar 11 is of sufficient strength and stiffness to support the brake beam and the parts carried thereby, such as the brake shoes, hangers, brake rods and levers, not shown, which form no part of the present invention, so as to prevent the same against falling to the track in the event said brake beam becomes detached from the brake hangers or other supporting means.

Secured to the upper side and the outer end of the supporting rod or member 11 by means of suitable rivets, bolts, or pins 14, and interposed between the underside of the tension member 12 and upper side of said supporting member or rod 11 is provided a combined anti-friction element, bearing, pad or rest 15, said element, pad or rest preferably having its upper surface curved, as shown in Figure 2, in order to provide a minimum surface of contact between said tension member 12 and said pad 15 during the different positions of the brake beam and angularity of the tension member 12 during the oscillation of the brake beam as a whole on its hangers when the brakes are applied and released. This bearing, pad or rest 15 may be of any suitable material or alloy, hardwood saturated with oil, creosote, or graphite, vulcanized fibre, or other similar material, which has less resistance to frictional wear or abrasion than that of the brake beam and will insure a reduction and minimum of friction between the contacting elements, and said bearing, pad or rest 15 is capable of taking up all the wear due to sliding contact between said bearing or pad and the tension or brake beam member, and thereby prevent the cross-sectional area of the tension member 12 or other member of the brake beam from becoming reduced and insured against the distortion and final breaking down of the brake beam and braking mechanism.

In Figure 3 is shown a form of bearing, pad or rest 16 which is curved on its upper and lower surfaces to adapt it to be fitted on a support bar or rod 17 which is curved in cross-section as shown.

Figure 4 is a modified form of the invention which is adapted for use in connection with a three-point brake beam support and shows the support or arm 111 having the bearing, pad or rest 151 raised and carried by a U-shaped braket 152, so as to not interfere with the movement and clear the brake lever, not shown. In the three-point support the end of the brake beam strut 9 engaging the tension member 12 and compression member 13 rests on the bearing, pad or rest 151, as shown, and needs no further disclosure.

Figures 5 and 6 show a readily removable and replaceable combined anti-friction and bearing element or pad 153, made of any suitable anti-friction material or composition, as hardwood saturated with lubricant, or vulcanized fibre, which is unaffected by heat, cold or moisture, and will be softer than iron or steel, and said pad or bearing 153 is secured to the arm or support 11 by means of U-shaped clamps 154 which straddle the ends of said pad 153, and their threaded ends passing through the support 11 and engaged by nuts 155 as shown.

Figures 7 and 8 illustrate a modification of the bearing element or pad shown in Figures 5 and 6, in which the bearing element or pad 156 has its ends 157, 157 reduced in cross-sectional area and rigidly secured to the arm or support 11 by means of bolts 158 with enlarged heads, as shown, and needs no further disclosure.

Figures 9 and 10 show a modification in which the anti-friction element or bearing 160 is attached by means of pins or rivets 161 to the arm or support 11 and is arranged instead parallel to the longitudinal axis of said support 11 as shown in Figures 5 and 7 is disposed at an angle or across the width of said support 11 for the purpose of exposing a greater or enlarged surface of the underside of the tension member 12 when moving over the bearing 160 from the position shown in full lines to that indicated by the dotted lines or vice versa.

Figures 11 and 12 show a modified form in which the anti-friction element or bearing 162, preferably also made of the same material as the bearings 15 and 153, shown in Figures 2 and 5, but is made tubular in cross-section, and held in position across the support 11 similar to the arrangement shown in Figure 9, by means of pins 163 passing into and engaging the tubular ends of the bearing 162, as shown, and needs no further description.

Figure 13 shows a modified form in which the tubular anti-friction element or bearing 164, similar to bearing 162, is rotatably supported by means of a U-shaped rod, circular in cross-section and having its ends 166 rigidly secured to the support 11, as indicated.

Figure 14 is a modified form of Figure 13 in which the rotary or fixed bearing 167 is made solid and its recessed ends are engaged by pins 168 fixed to the support 11, as shown.

From the foregoing disclosure of the construction and arrangement of the invention, it will be seen that by the arrangement, disposition and construction of the combined anti-friction and bearing element, pad or rest, a double function of said element, pad or rest is obtained, in that it not only acts as a friction-reducing element, but at the same time receives substantially all the wear and prevents the wear of any member of the brake beam which comes in contact with the brake beam support, thereby insuring an easy, constant and efficient operation of the braking mechanism and assures the immediate and quick return of the brake beam to its normal position and proper release of the brake shoes when the brake returning mechanism is actuated.

Furthermore, said bearing element, pad or rest is inexpensive to manufacture, can be easily inspected, removed, or replaced when worn out, and is not affected by the elements or rust, and adds no material weight to the braking mechanism, and requires no careful adjustment, and it is not capable of becoming distorted, or fouled with the other elements of said braking mechanism.

From the foregoing disclosure of the construction, arrangement and manner of assembling and operation of the device, it will be seen that all of the objects and advantages recited in the statement of invention have been fully and efficiently carried out, and while I have shown the preferred forms or modifications of carrying out the invention many other and similar expedients will readily suggest themselves without in any way departing from the present invention.

What is claimed is:

1. In a truck, a brake beam, a supporting bar mounted to underlie said brake beam, and a combined antifriction and bearing element carried by said supporting bar and in contact with said brake beam and having less resistance to frictional wear or abrasion than said brake beam and for slidably supporting said brake beam.

2. In a truck, a brake beam, a supporting bar affixed to said truck and mounted to underlie said brake beam and a combined anti-friction and bearing element carried by said supporting bar and in contact with said brake beam for slidably supporting said brake beam, said bearing element made of material having less resistance to frictional wear or abrasion than the contacting metal portion of said brake beam.

3. In a truck, a spring-plank, a brake beam, a supporting bar affixed to said spring-plank and extending beneath said brake beam, and a combined anti-friction and bearing element carried by the upper surface of said supporting bar and in contact with said brake beam and having less resistance to frictional wear or abrasion than said brake beam and for slidably supporting said brake beam.

4. In a truck, a spring-plank, a brake beam, a supporting bar affixed to said spring-plank and extending beneath said brake beam, a combined anti-friction and bearing element having an upper outwardly curved bearing surface in contact with said brake beam and having less resistance to frictional wear or abrasion than said brake beam and for slidably supporting with a minimum of friction said brake beam at different angular relations with respect to said supporting element.

5. In a truck, the combination of a brake beam, a supporting bar affixed to a truck portion and extending transversely below the brake beam to afford a safety support in the event of detachment of the beam, and a combined anti-friction and bearing element associated with said supporting bar and interposed between said supporting bar and brake beam to provide a third or fourth point support for the latter upon the former, said bearing element having less resistance to frictional wear or abrasion than said brake beam.

6. In a truck, a brake beam, a supporting bar affixed to a truck part and extending beneath the beam and a combined anti-friction and bearing pad associated with and between said brake beam and supporting bar for supporting the former upon the latter for sliding movement thereon, said bearing pad having less resistance to frictional wear or abrasion than said brake beam.

7. In a truck, a spring-plank, a brake beam, a supporting bar affixed to said spring-plank and extending beneath said brake beam, and a combined anti-friction and bearing element circular in cross-section and attached to the upper surface of said supporting bar and in contact with said brake beam for slidably supporting said brake beam, said bearing element having less resistance to frictional wear or abrasion than said brake beam.

8. In a truck, a brake beam, a supporting bar affixed to a truck part and extending beneath the beam and a rotatable combined anti-friction and bearing element associated with and between said brake beam and supporting bar for supporting the former upon the latter for movement thereover, said bearing element having less resistance to frictional wear or abrasion than said brake beam.

In testimony whereof I have hereunto affixed my signature.

BRODERICK HASKELL.